US012282327B2

(12) United States Patent
Coleman, II et al.

(10) Patent No.: US 12,282,327 B2
(45) Date of Patent: Apr. 22, 2025

(54) DATA PROCESSING SYSTEM WITH MACHINE LEARNING ENGINE FOR PROVIDING DRIVING DATA ANALYSIS AND VEHICLE CONTROL FUNCTIONS

(71) Applicant: Allstate Insurance Company, Northbrook, IL (US)

(72) Inventors: Neal Edgar Coleman, II, Evanston, IL (US); Matthew Davis Best, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/722,134

(22) Filed: Oct. 2, 2017

(65) Prior Publication Data
US 2019/0101914 A1    Apr. 4, 2019

(51) Int. Cl.
*G05D 1/00*    (2024.01)
*B60W 30/00*    (2006.01)
(Continued)

(52) U.S. Cl.
CPC .......... *G05D 1/0055* (2013.01); *B60W 30/00* (2013.01); *G08G 1/0104* (2013.01);
(Continued)

(58) Field of Classification Search
CPC ... G05D 1/0055; B60W 30/00; G08G 1/0104; G08G 1/0145
See application file for complete search history.

(56) References Cited

U.S. PATENT DOCUMENTS 6,836,719 B2    12/2004  Andersson et al.
7,389,178 B2    6/2008   Raz et al.
(Continued)

FOREIGN PATENT DOCUMENTS

DE    102011012793 A1    9/2012
WO    2015094645 A1      6/2015
(Continued)

OTHER PUBLICATIONS

Nov. 26, 2018—(WO) Search Report and Written Opinion—App PCT/US2018/052815.
(Continued)

*Primary Examiner* — Christian Chace
*Assistant Examiner* — Katherine Marie Fitzharris
(74) *Attorney, Agent, or Firm* — Polsinelli PC

(57) ABSTRACT

Systems and apparatuses for using machine learning to generate a safety output are provided. In some examples, data may be received from a plurality of sources, may be analyzed and one or more machine learning datasets may be generated based on the analyzed data. In some arrangements, data may be received from one or more vehicles. The vehicles may be autonomous, semi-autonomous, or non-autonomous, and/or configured to operate in one or more of those modes. The data may be evaluated based on the one or more machine learning datasets to determine a safety output associated with the data. The safety output may then be used to classify the data and/or to generate one or more instructions for operation of an autonomous vehicle. The instruction(s) may be transmitted to the autonomous vehicle and may modify operation of the vehicle (e.g., to improve safety associated with the vehicle).

19 Claims, 10 Drawing Sheets

(51) Int. Cl.
*G06N 20/00* (2019.01)
*G08G 1/01* (2006.01)
*G08G 1/0967* (2006.01)

(52) U.S. Cl.
CPC ........... *G08G 1/0112* (2013.01); *G08G 1/012* (2013.01); *G08G 1/0129* (2013.01); *G08G 1/0145* (2013.01); *G08G 1/096725* (2013.01); *G08G 1/096741* (2013.01); *G08G 1/096775* (2013.01); *G06N 20/00* (2019.01)

(56) References Cited

U.S. PATENT DOCUMENTS

| | | | |
|---|---|---|---|
| 8,634,980 B1 | 1/2014 | Urmson et al. | |
| 8,903,593 B1* | 12/2014 | Addepalli | H04L 43/0858 |
| | | | 701/30.6 |
| 8,909,415 B1 | 12/2014 | Hawley | |
| 9,494,439 B1 | 11/2016 | Ross et al. | |
| 9,511,767 B1 | 12/2016 | Okumura et al. | |
| 9,587,952 B1 | 3/2017 | Slusar | |
| 2008/0120025 A1 | 5/2008 | Naitou et al. | |
| 2014/0225750 A1* | 8/2014 | Sloop | G01C 21/3691 |
| | | | 340/905 |
| 2014/0343972 A1 | 11/2014 | Fernandes et al. | |
| 2015/0112731 A1 | 4/2015 | Binion et al. | |
| 2015/0166069 A1 | 6/2015 | Engelman et al. | |
| 2015/0187019 A1 | 7/2015 | Fernandes et al. | |
| 2015/0274028 A1* | 10/2015 | Payne | B60L 53/00 |
| | | | 903/903 |
| 2016/0026182 A1 | 1/2016 | Boroditsky et al. | |
| 2016/0176412 A1 | 6/2016 | Gunaratne | |
| 2016/0247394 A1 | 8/2016 | Stenneth | |
| 2016/0357185 A1 | 12/2016 | Laur et al. | |
| 2017/0162050 A1 | 6/2017 | Chen et al. | |
| 2017/0200061 A1* | 7/2017 | Julian | G06V 20/56 |
| 2017/0213462 A1 | 7/2017 | Prokhorov | |
| 2017/0261990 A1* | 9/2017 | Lei | B60W 50/14 |
| 2018/0141564 A1* | 5/2018 | Ross | B60W 50/0098 |

FOREIGN PATENT DOCUMENTS

| | | |
|---|---|---|
| WO | 2016109540 A1 | 7/2016 |
| WO | 2017192261 A1 | 11/2017 |

OTHER PUBLICATIONS

AbuAli, et al., "Driver Behavior Modeling: Developments and Future Directions," Hindawi Publishing Corporation International Journal of Vehicular Technology, vol. 2016, Artickle ID 6952791, Nov. 8, 2016, retrieved from https://www.hindawi.com/journals/ijvt/2016/6952791/abs/, 13 pages.

Enev, et al, "Automobile Driver Fingerprint," Proceeding on Privacy Enhancing Technologies; retrieved from http://www.autosec.org/pubs/fingerprint.pdf; 2015 (1): pp. 34-51.

* cited by examiner

DATA PROCESSING SYSTEM WITH MACHINE LEARNING ENGINE FOR PROVIDING DRIVING DATA ANALYSIS AND VEHICLE CONTROL FUNCTIONS

FIELD OF ART

Aspects of the disclosure generally relate to arrangements for using machine learning to determine an output associated with driving data and controlling aspects of operation of autonomous vehicles based on the determined output.

BACKGROUND

Autonomous vehicles are becoming more prevalent in today's society. Autonomous vehicle control instructions focus on safe operation of the vehicle. Accordingly, identifying safe driving datasets is imperative in providing training data to autonomous vehicles. However, it is often difficult to identify safe driving datasets, behaviors, etc. due to lack of sufficient data, lack of uniformity in understanding what may or may not be a safe driving behavior, and the like. Further, it may be difficult to not only identify the safe driving datasets or behaviors, but also to identify them in real-time and quickly and efficiently update instructions used by the autonomous vehicle to operate. Accordingly, identifying a ride performance characteristic associated with driving data, determining a safety output, and transmitting instructions to an autonomous vehicle based on the safety output would be advantageous.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure relate to systems and arrangements for using machine learning datasets to generate a safety output. In some examples, data may be received from a plurality of sources. For example, driving data and/or vehicle operational data may be received from a plurality of vehicles. Additionally or alternatively, other types of data may be received (e.g., environmental conditions, historical data, and the like). This data may be analyzed and one or more machine learning datasets may be generated based on the analyzed data.

In some arrangements, data may be received from one or more vehicles. The vehicles may be autonomous, semi-autonomous, or non-autonomous, and/or configured to operate in one or more of those modes. The data may be evaluated based on the one or more machine learning datasets to determine a safety output associated with the data. For instance, in some examples, a ride performance characteristic, such as a level of safety, quantified smoothness of a ride, level of satisfaction with a ride, or the like, may be determined. This may then be used to classify the data and/or to generate one or more instructions for operation of an autonomous vehicle. The instruction(s) may be transmitted to the autonomous vehicle and may modify operation of the vehicle (e.g., to improve safety associated with the vehicle).

In some examples, data may be received from one or more third parties and may be evaluated based on the one or more machine learning datasets. The safety output may then be transmitted back to the third party for further use.

Of course, the arrangements described may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
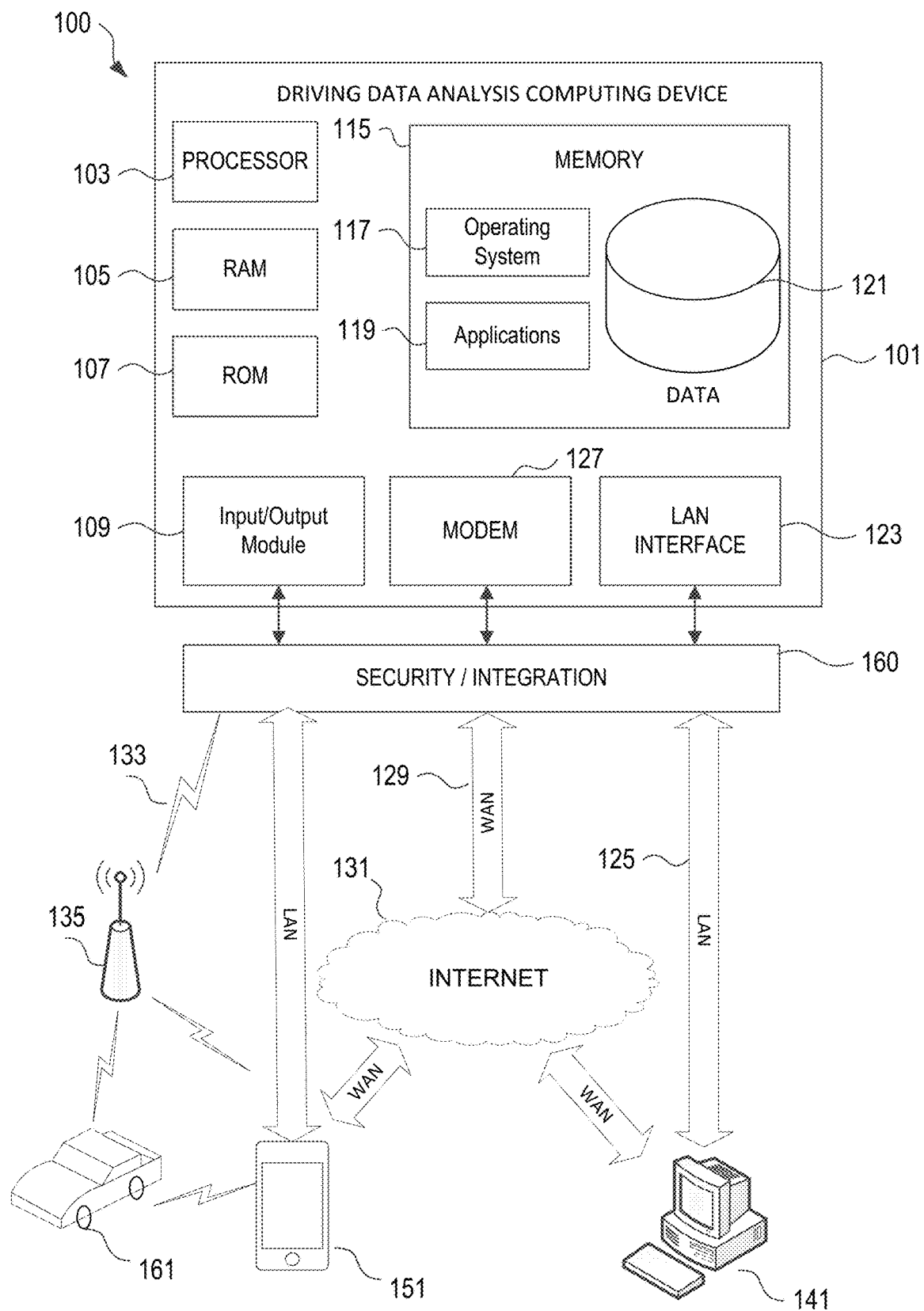
FIG. 1 illustrates one example operating environment in which one or more aspects described herein may be implemented.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

As will be discussed more fully herein, arrangements described herein are directed to using machine learning to determine an output and modifying operation or control of a vehicle based on the output. For instance, operational instructions for one or more autonomous or semi-autonomous vehicles may be generated based on an output generated from driving data, vehicle operational data, and the like.

Conventional systems for controlling operation of an autonomous vehicle may rely on historical data and driving behaviors. Although updates to this data may be made, the updates might not be made in real-time. Further, the updates might rely on additional data that has a limited scope (e.g., operation of few vehicles). Further still, the updates might not include additional data, such as environmental conditions, historical vehicle damage data, and the like, when generating or updating operational instructions.

As discussed more fully herein, various arrangements described herein include receiving data from a plurality of sources to generate one or more machine learning datasets. For instance, data may be received from sensors in a plurality of vehicles (e.g., via one or more vehicle systems), sensors in one or more mobile devices (e.g., via one or more mobile device systems), and the like. In some examples, data may be received from hundreds, thousands, or possibly tens of thousands of systems (e.g., vehicles, mobile devices, etc.). Additionally or alternatively, data may be received from one or more internal data computer systems that may include data related to historical vehicle damage, costs of repair, severity of damage, and the like. This data may be based on years of vehicle information from hundreds, thousands, or tens of thousands of vehicles and vehicle incidents. Further, in some examples, data may be received from external computer systems that may provide information such as traffic conditions, weather conditions, roadway conditions, type of road, speed limits, and the like.

The received data may be analyzed and one or more machine learning datasets may be generated. The machine learning datasets may link one or more driving behaviors, vehicle operational parameters, or the like, to a ride performance characteristic, such as a level of safety or other safety output based on the analyzed data used to generate the machine learning datasets.

In some examples, additional data may be received from one or more vehicles. The vehicle driving datasets may be evaluated based on the one or more machine learning datasets to generate a safety output associated with the dataset. Based on the safety output, in some examples, one or more instructions to modify operation of an autonomous vehicle may be generated, transmitted to the vehicle, and implemented.

In some examples, the additional data may be a driving dataset received from a third party, such as a third party vendor rather than directly from a vehicle. The data may be evaluated based on the one or more machine learning datasets and a safety output may be generated. The safety output may then be transmitted to the third party vendor for further use.

Some or all of the aspects described herein (e.g., receiving driving data from a vehicle, evaluating driving data, generating instructions, transmitting instructions, modifying operation of an autonomous vehicle, and the like) may be performed in real-time or near real-time.

These and various other arrangements will be described more fully herein.

FIG. 1 illustrates a block diagram of one example driving data analysis computing device (or system) 101 in a computer system 100 that may be used according to one or more illustrative embodiments of the disclosure. The driving data analysis computing device 101 may have a processor 103 for controlling overall operation of the device 101 and its associated components, including RAM 105, ROM 107, input/output module 109, and memory 115. The driving data analysis computing device 101, along with one or more additional devices (e.g., terminals 141 and 151, security and integration hardware 160) may correspond to any of multiple systems or devices described herein, such as personal mobile devices, vehicle-based computing devices, insurance systems servers, driving data analysis servers, internal data sources, external data sources and other various devices in a driving data analysis system. These various computing systems may be configured individually or in combination, as described herein, for receiving signals and/or transmissions from one or more computing devices, analyzing the signals received to evaluate driving data, generating machine learning datasets, and the like, using the devices of the driving data analysis systems described herein. In addition to the features described above, the techniques described herein also may be used for using machine learning datasets to generate a prediction of one or more safety outputs, and the like.

Input/Output (I/O) 109 may include a microphone, keypad, touch screen, and/or stylus through which a user of the driving data analysis computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within driving data analysis systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, driving data analysis server 101, etc.), in order to receive and analyze the signals, transmissions, etc., evaluate the signals (including, in some examples, filtering the signals or data, removing noise from the data, and the like), generate one or more machine learning datasets, use the generated machine learning datasets to predict one or more safety outputs, and the like using the various devices of the driving data analysis systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the driving data analysis computing device 101 to execute a series of computer-readable instructions, for example, receive signals or transmissions, evaluate the signals or transmissions, generate one or more machine learning datasets, implement the one or more machine learning datasets, and the like.

The computing device (e.g., a personal mobile device, vehicle-based system, insurance system server, driving data analysis server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the driving data analysis computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, a vehicle data analysis and safety output server, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a device 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting cloud-based vehicle identification, vehicle and driver data retrieval and analysis, location identification, and the like. In other examples, the security and integration layer 160 may correspond to separate hardware and software components which may be operated at a separate physical location and/or by a separate entity.

As discussed below, the data transferred to and from various devices in a computer system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, vehicle data analysis and safety output servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in the computer system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, location data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, and/or driving trip data analysis web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, database of vehicle information, database of location information, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of driving data analysis systems, such as faster evaluation of data, more efficient and faster generation of safety predictions, and less dependence on network conditions when transmitting and receiving driver information, vehicle information, location information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in driving data analysis system components described herein may be configured to communicate using any of these network protocols or technologies.

Additionally, one or more application programs 119 may be used by the various computing devices 101 within the computer system 100 (e.g., vehicle data, driver data, location data analysis software applications, etc.), including computer executable instructions for receiving and analyzing various signals or transmissions, evaluating the received signals or transmissions, generating one or more machine learning datasets, implementing the one or more machine learning datasets to predict one or more safety outputs, and the like.

Figure 2A:
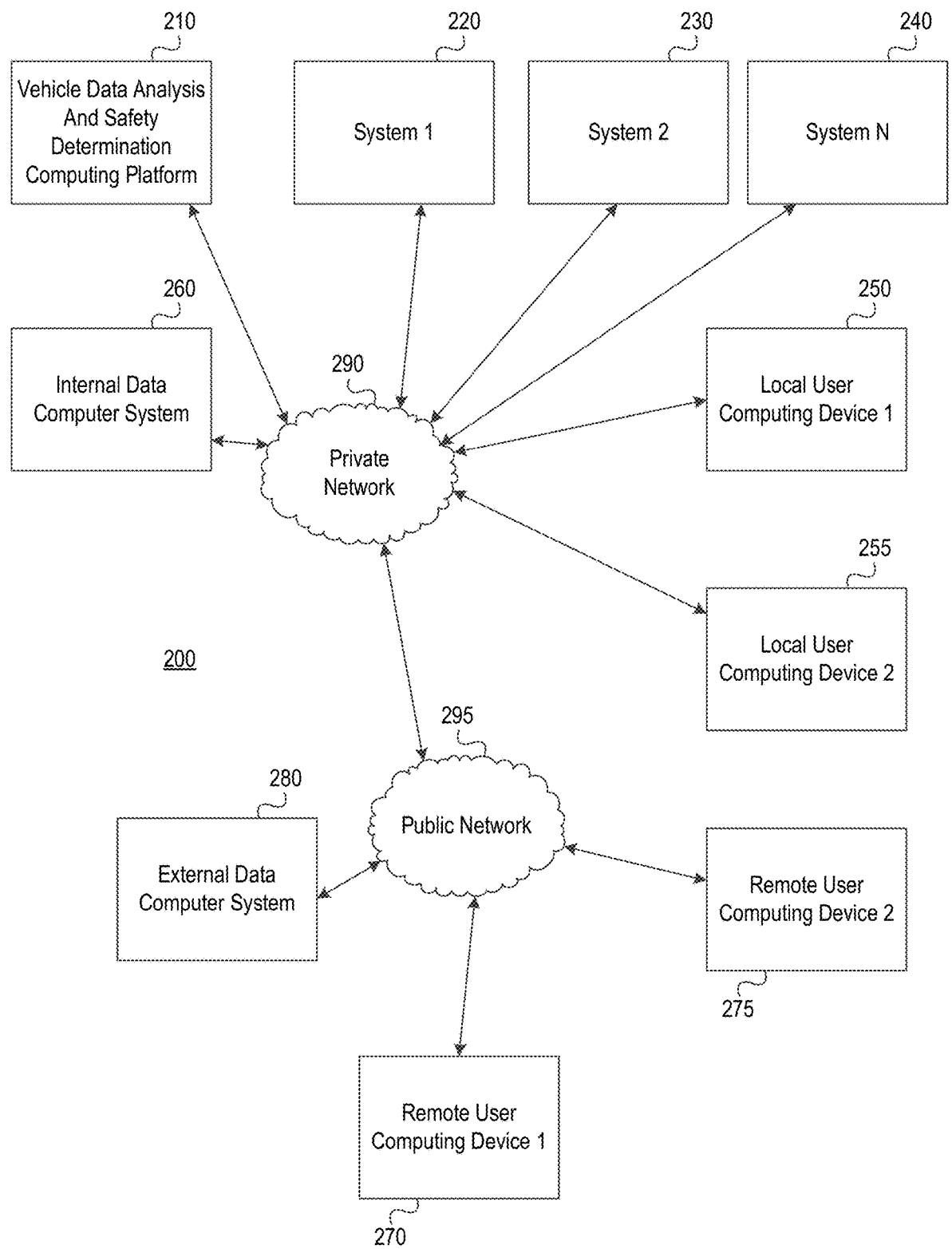
FIGS. 2A and 2B illustrate another example operating environment for providing vehicle data analysis, safety output, and vehicle control functions in accordance with one or more aspects described herein
Figure 2B:
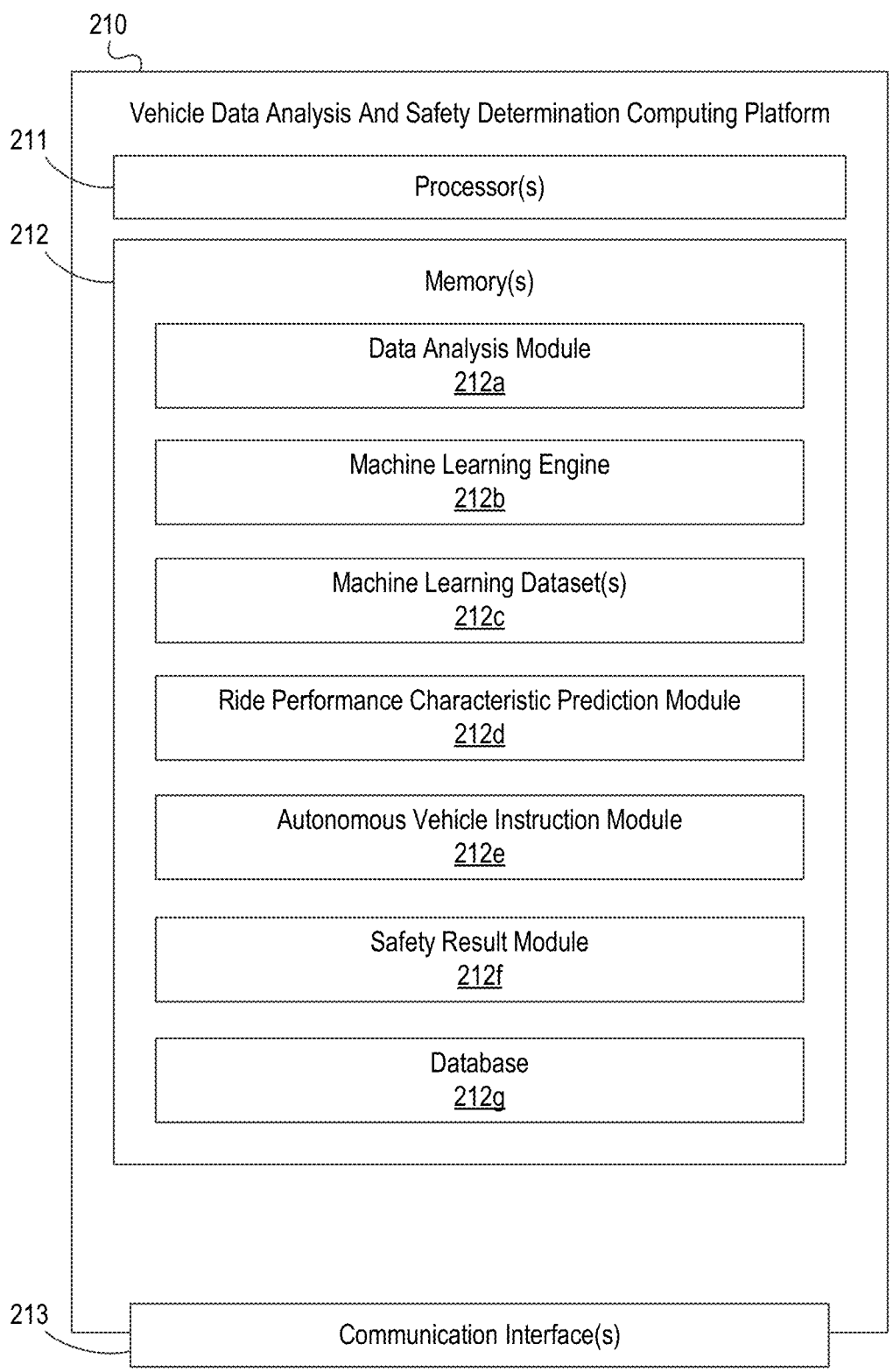

FIGS. 2A and 2B depict an illustrative computing environment for implementing and using a data processing system with a machine learning engine to provide driving data analysis functions in accordance with one or more aspects described herein. Referring to FIG. 2A, computing environment 200 may include one or more computing devices and/or other computing systems. For example, computing environment 200 may include a vehicle data analysis and safety determination computing platform 210, a first system 220, a second system 230, an Nth system 240, an internal data computer system 260, and external data computer system 280, a first local user computing device 250, a second local user computing device 255, a first remote user computing device 270, and a second remote user computing device 275.

Vehicle data analysis and safety determination computing platform 210 may be configured to host and/or execute a machine learning engine to provide automated data analysis functions, safety determination functions, and the like, as discussed in greater detail below. In some instances, vehicle data analysis and safety determination computing platform 210 may monitor and/or receive data from one or more systems, such as system 220, 230, 240 to predict a safety output (e.g., a safety score or other metric) associated with the data received (e.g., driving behaviors associated with different drivers, different vehicles, etc.). The determined safety output may be used to improve driving behaviors (e.g., by transmitting a notification to a user), as training data for autonomous vehicles, to updated autonomous vehicle driving instructions (in real-time or near real-time, in some arrangements), and/or to rate or score driving data (e.g., data received from third party for evaluation).

System 1 220, system 2 230, and/or system N 240, may be any type of system, device, application, or the like, monitored by or configured to transmit data (e.g., signals, raw sensor data, and the like) to the vehicle data analysis and safety determination computing platform 210. For instance, the systems may be one or more of servers, applications executing on one or more devices, other computing platforms, and the like. The systems, in at least some examples, may be systems configured to collect data from one or more vehicles and/or may be located in or associated with one or more vehicles. Further, the systems may include operational instructions for operation of a vehicle associated therewith when operating in an autonomous or semi-autonomous mode.

The data may be sensor data and/or other data related to one or more driving behaviors. In some arrangements, the systems may include one or more on-board vehicle computing devices, one or more mobile devices of a user, one or more telematics devices, and the like. In some examples, data may be received from a plurality of vehicles (e.g., a hundred, thousands, tens of thousands, and the like) and may be analyzed by vehicle data analysis and safety determination computing platform 210. Further, the data received from the systems may, in some examples, be trip data (e.g., data collected between a first point and a second point, a starting point and a final destination (e.g., that may include intermediate stops), and the like). Additionally or alternatively, the data may be collected at a more granular level and may include data for predetermined time windows, segments of trips (e.g., travel between a first point at which the vehicle is stopped for greater than a threshold time period and a second point at which the vehicle is stopped for greater than the threshold time period), and the like.

Types of data collected and analyzed may include data related to hard braking events, time spent driving after dark (e.g., based on location (e.g., global positioning system (GPS) data), incidents of swerving, failure to remain in a lane/lane departure, type of roadway, traffic in the area at the time of the vehicle, weather or other environmental conditions, construction in the area, and the like, as will be discussed more fully herein.

In some examples, one or more of systems 220, 230, 240, or the like, may receive data from other vehicles, infrastructure, and the like, via vehicle-to-vehicle (V2V) and/or vehicle-to-infrastructure (V2I) technology, as will be discussed more fully herein.

Internal data computer system 260 may be configured to monitor, collect, store and/or transmit data related to historical system data, insurance policy data, insurance claim data, and the like. In some examples, the insurance claim data may include data associated with a type of accident (e.g., rear end, front end, etc.), an amount of damage associated with the accident, whether there were injuries involved, type and/or extent of injuries, and the like. The internal data computer system 260 may include one or more databases configured to store data and transmit data, as requested, to, for instance, the vehicle data analysis and safety determination computing platform 210. In some examples, claim data, liability data, and the like, may be used to generate one or more machine learning sets based on damage to vehicles, injuries reported, type of accident, type of injury, and the like.

External data computer system 280 may be configured to monitor, collect, store and/or transmit data related to publicly available data (e.g., traffic camera data), weather data, construction or road condition data, data from one or more pieces of infrastructure, and the like. The external data computer system 280 may include one or more databases configured to store data and transmit data, as requested, to, for instance, the vehicle data analysis and safety determination computing platform 210. In some examples, data received from the external data computer system 280 may be used to generate one or more machine learning sets based on, for example, weather conditions, traffic conditions, road type, road conditions, and the like. In some examples, this data may be collected from a time and/or location associated with a known accident or incident (e.g., as determined from data received from internal data computer system 260).

Local user computing device 250, 255 and remote user computing device 270, 275 may be configured to communicate with and/or connect to one or more computing devices or systems shown in FIG. 2A. For instance, local user computing device 250, 255 may communicate with one or more computing systems or devices via network 290, while remote user computing device 270, 275 may communicate with one or more computing systems or devices via network 295. The local and remote user computing devices may be used to provide access one or more systems being monitored (e.g., from which data is collected), to collect data (e.g., from a mobile device of a user), as well as to display one or more notifications, as will be discussed more fully below.

In one or more arrangements, system 1 220, system 2 230, system N 240, internal data computer system 260, external data computer system 280, local user computing device 250, local user computing device 255, remote user computing device 270, and remote user computing device 275 may be any type of computing device capable of performing the particular functions described herein. For example, system 1 220, system 2 230, system N 240, internal data computer system 260, external data computer system 280, local user computing device 250, local user computing device 255, remote user computing device 270, and remote user computing device 275 may, in some instances, be and/or include server computers, desktop computers, laptop computers, tablet computers, smart phones, on-board vehicle computing devices, or the like that may include one or more processors, memories, communication interfaces, storage devices, and/or other components. As noted above, and as illustrated in greater detail below, any and/or all of system 1 220, system 2 230, system N 240, internal data computer system 260, external data computer system 280, local user computing device 250, local user computing device 255, remote user computing device 270, and remote user computing device 275 may, in some instances, be special-purpose computing devices configured to perform specific functions.

Computing environment 200 also may include one or more computing platforms. For example, and as noted above, computing environment 200 may include vehicle data analysis and safety determination computing platform 210. As illustrated in greater detail below, vehicle data analysis and safety determination computing platform 210 may include one or more computing devices configured to perform one or more of the functions described herein. For example, vehicle data analysis and safety determination computing platform 110 may include one or more computers (e.g., laptop computers, desktop computers, servers, server blades, or the like).

As mentioned above, computing environment 200 also may include one or more networks, which may interconnect one or more of vehicle data analysis and safety determination computing platform 210, system 1 220, system 2 230, system N 240, internal data computer system 260, external data computer system 280, local user computing device 250, local user computing device 255, remote user computing device 270, and remote user computing device 275. For example, computing environment 200 may include private network 290 and public network 295. Private network 290 and/or public network 295 may include one or more sub-networks (e.g., Local Area Networks (LANs), Wide Area Networks (WANs), or the like). Private network 290 may be associated with a particular organization (e.g., a corporation, financial institution, insurance provider, educational institution, governmental institution, or the like) and may interconnect one or more computing devices associated with the organization. For example, vehicle data analysis and safety determination computing platform 210, system 1 220, system 2 230, system N 240, internal data computer system 260, local user computing device 250, and local user computing device 255 may be associated with an organization (e.g., an insurance provider), and private network 290 may be associated with and/or operated by the organization, and may include one or more networks (e.g., LANs, WANs, virtual private networks (VPNs), or the like) that interconnect vehicle data analysis and safety determination computing platform 210, system 1 220, system 2 230, system N 240, internal data computer system 260, local user computing device 250, and local user computing device 255 and one or more other computing devices and/or computer systems that are used by, operated by, and/or otherwise associated with the organization. Public network 295 may connect private network 290 and/or one or more computing devices connected thereto (e.g., vehicle data analysis and safety determination computing platform 210, system 1 220, system 2 230, system N 240, internal data computer system 260, local user computing device 250, and/or local user computing device 255) with one or more networks and/or computing devices that are not associated with the organization. For example, external data computer system 280, remote user computing device 270 and remote user computing device 275 might not be associated with an organization that operates private network 290 (e.g., because external data computer system 280, remote user computing device 270 and remote user computing device 275 may be owned, operated, and/or serviced by one or more entities different from the organization that operates private network 290, such as one or more customers of the organization and/or vendors of the organization, one or more public entities, one or more third parties, or the like, rather than being owned and/or operated by the organization itself or an employee or affiliate of the organization), and public network 295 may include one or more networks (e.g., the internet) that connect external data computer system 280, remote user computing device 270 and remote user computing device 275 to private network 290 and/or one or more computing devices connected thereto (e.g., vehicle data analysis and safety determination computing platform 210, system 1 220, system 2 230, system N 240, internal data computer system 260, local user computing device 250, and/or local user computing device 255).

Referring to FIG. 2B, vehicle data analysis and safety determination computing platform 210 may include one or more processors 211, memory 212, and communication interface 213. A data bus may interconnect processor(s) 211, memory 212, and communication interface 213. Communication interface 213 may be a network interface configured to support communication between vehicle data analysis and safety determination computing platform 210 and one or more networks (e.g., private network 290, public network 295, or the like). Memory 212 may include one or more program modules having instructions that when executed by processor(s) 211 cause vehicle data analysis and safety determination computing platform 210 to perform one or more functions described herein and/or one or more databases that may store and/or otherwise maintain information which may be used by such program modules and/or processor(s) 211. In some instances, the one or more program modules and/or databases may be stored by and/or maintained in different memory units of vehicle data analysis and safety determination computing platform 210 and/or by different computing devices that may form and/or otherwise make up vehicle data analysis and safety determination computing platform 210.

For example, memory 212 may have, store, and/or include a data analysis module 212a. Data analysis module 212a may store instructions and/or data that may cause or enable the vehicle data analysis and safety determination computing platform 210 to receive, store and/or analyze data from one or more systems, devices, applications, or the like, being monitored by or transmitting data to the vehicle data analysis and safety determination computing platform 210. The data analysis module 212a may receive, for example, driving or other vehicle data from one or more vehicles, associated with one or more drivers, and the like. In some examples, the data may be segregated into portions. For instance, data related to a particular trip may be segregated from data related to other trips, portions of trips (e.g., segments of trip data that may comprise less than the entire trip) may be segregated from other portions or segments of the trip, and the like). The data analysis module 212a may also receive data from internal data computer system 260, external data computer system 280, and the like. The data analysis module 212a may receive and analyze the data that may be used to (e.g., by machine learning engine 212b) to generate one or more machine learning datasets 212c.

Additionally or alternatively, the data analysis module 212a may receive data from one or more vehicles and may compare the data to one or more machine learning datasets 212c. The comparison data may be used to generate one or more safety predictions or determinations, generate autonomous vehicle instructions or commands, generate a safety result, or the like, as will be discussed more fully herein.

Memory 112 may further have, store and/or include a machine learning engine 212b and machine learning datasets 212c. Machine learning engine 212b and machine learning datasets 212c may store instructions and/or data that cause or enable vehicle data analysis and safety determination computing platform 210 to determine or predict, in real-time and based on received data, a safety output, score or level for a particular dataset (e.g., trip data received, segment data received, driver data received, and the like). The machine learning datasets 212c may be based on, for example, driver data, vehicle data, insurance policy data, insurance claim data, external data (e.g., weather conditions, traffic levels, etc.), and the like.

The machine learning engine 212b may receive data from a plurality of sources (e.g., data received by data analysis module 212a from, for example, system 1 220, system 2 230, system N 240, internal data computer system 260, external data computer system 280, and the like) and, using one or more machine learning algorithms, may generate one or more machine learning datasets 212c. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 212b may analyze data to identify patterns of activity, sequences of activity, and the like, to generate one or more machine learning datasets 212c. Additionally or alternatively, the machine learning engine 212b may analyze a frequency of issue occurring. For instance, the machine learning engine 212b may analyze data to determine whether a frequency of a particular issue, behavior or indication for a particular vehicle, system, driver, or the like, occurred a threshold number of times within a predetermined time period. This information may be used to generate one or more machine learning datasets 212c.

The machine learning datasets 212c may include machine learning data linking one or more behaviors identified from driving data with a safety rating. For instance, driving data may be analyzed to link driving behaviors, as well as external environmental conditions, and the like, to an accident, frequency of accident, type of accident, severity of accident, and the like. This information may then be used to predict whether received driving data should be considered safe or unsafe (e.g., above a safety threshold or below a safety threshold). In some examples, the machine learning datasets 212c may be used to generate a safety score for receiving driving data to determine whether it is considered safe or unsafe (e.g., score at or above threshold may be safe, while score below threshold may be considered unsafe).

Memory 212 may further include ride performance characteristic prediction module 212d. Ride performance characteristic prediction module 212d may store instructions and/or data that may cause or enable the vehicle data analysis and safety determination computing platform 210 to compare the received data (e.g., from data analysis module 212a or working in conjunction with data analysis module 212a) to one or more machine learning datasets to determine a ride performance characteristic prediction for the received driving data. For example, driving data may be received, from one or more systems and via the data analysis module 212a, that includes sensor data collected from one or more vehicles. The received data may be compared to one or more machine learning datasets 212c to determine a ride performance characteristic, such as a safety output for the dataset. In some examples, the safety output may include a determination of whether the received driving data is considered safe or unsafe (e.g., a binary decision). Additionally or alternatively, the safety output may include a score or rating associated with a level of safety for the driving data. Data having a score at or above a threshold may be considered safe, while scores below the threshold may be considered unsafe. In another example, the safety output may include a level of smoothness, level of satisfaction with the ride, or the like.

In some examples, multiple thresholds may be used. For instance, a safety score may be determined for a set of driving data and the score may be compared to a first threshold, if at or above the first threshold, the driving dataset may be considered safe. If below the threshold, the driving dataset may be considered unsafe. Unsafe driving determinations may result in a notification being transmitted to a driver associated with the data (e.g., via a mobile device of the user, via an on-board vehicle computing device display, or the like). If the score for the driving dataset is at or above the first threshold, the score for the driving dataset may be compared to a second, higher threshold. If the score for the driving dataset is at or above the second threshold, the driving dataset may be considered highly safe and may be used to generate instructions for autonomous vehicles, may be used as example driving behaviors for other drivers, and the like. If the score for the driving dataset is below the second threshold (but at or above the first threshold) the score may be considered safe and, in some examples, no action may be taken or one or more additional actions (e.g., notifications, and the like) may be taken.

Although examples using one and two thresholds are provided, additional thresholds may be used without departing from the invention.

Memory 212 may have, store, and/or include an autonomous vehicle instruction module 212e. The autonomous vehicle instruction module 212e may store instructions and/or data that may cause or enable the vehicle data analysis and safety determination computing platform 210 to generate one or more instructions to an autonomous vehicle and/or transmit one or more instructions to the autonomous vehicle. For instance, the autonomous vehicle instruction module 212e may, based on, for example, a determination that a safety score for a driving dataset is considered highly safe (e.g., based on comparison to one or more thresholds) an instruction modifying one or more commands associated with operating the autonomous vehicle may be generated. The instruction may be transmitted to the autonomous vehicle and may be implemented by the autonomous vehicle, thereby modifying the commands and instructions used to control operation of the autonomous vehicle to reflect the additional data identified as highly safe.

In some examples, driving datasets may be received from one or more non-autonomous or semi-autonomous vehicles, may be evaluated to determine a safety output, and the safety output may be used to generate one or more instructions for one or more autonomous vehicles (e.g., instructions modifying operation of one or more autonomous vehicles). Additionally or alternatively, driving data sets may be received from one or more autonomous vehicles, may be evaluated to determine a safety output, and the safety output may be used to update or validate one or more machine learning datasets, generate one or more instructions for modifying operation of one or more autonomous vehicles, and the like.

In some arrangements, driving datasets may be received from third parties (e.g., rather than directly from a vehicle). The third party may be a vendor, insurance provider, or the like, that may desire to determine whether a particular set of driving data should be considered safe. Accordingly, the driving dataset(s) may be received by safety result module 212f. Safety result module 212f may have and/or store instructions and/or data that may cause or enable vehicle data analysis and safety determination computing platform 210 to compare the received datasets to one or more machine learning datasets to determine whether the dataset includes safe or unsafe driving data (or to score the driving data, as discussed herein). Accordingly, the safety result module 212f may generate outputs for driving data received from outside sources similar to outputs generated by ride performance characteristic prediction module 212d for driving data received directly from driving data sources (e.g., from vehicle sensors, mobile device sensors within the vehicle, V2V communications with the vehicle, and the like).

Vehicle data analysis and safety determination computing device 210 may further include one or more databases 212g. The one or more databases 212g may store data associated with safety determinations, historical data, system data received, and the like.

Although the various modules of the vehicle data analysis and safety determination computing platform 210 are described separately, functionality of the various modules may be combined and/or may be performed by a single device or multiple computing devices in communication without departing from the invention.

Figure 3:
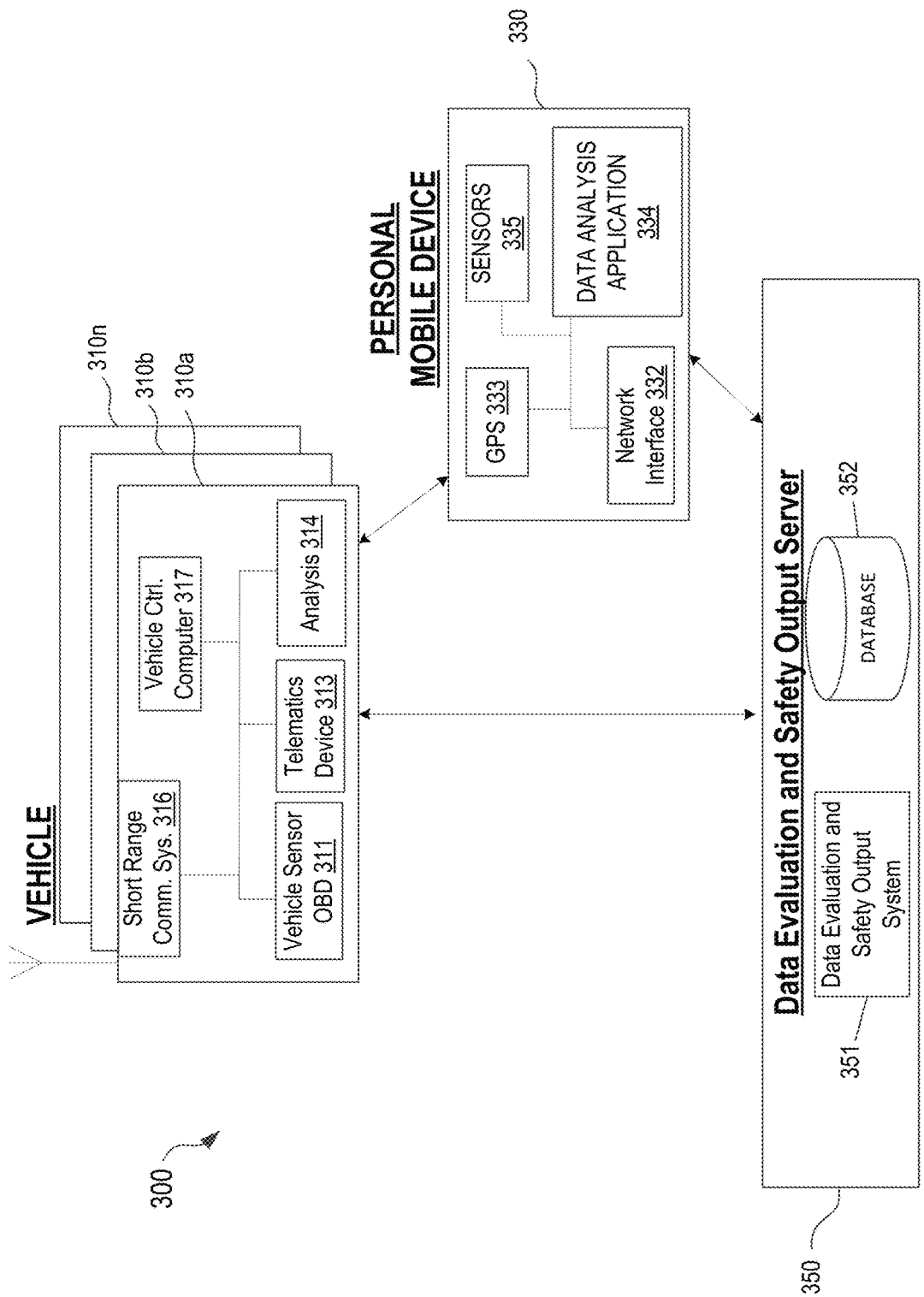
FIG. 3 illustrates one example vehicle data analysis and safety output system in accordance with one or more aspects described herein.

FIG. 3 is a diagram of an illustrative vehicle data analysis and safety determination system. One or more aspects of the system shown in FIG. 3 may be similar to and/or may be used in conjunction with aspects described with respect to the arrangements of FIGS. 2A and 2B. The system 300 includes a plurality of vehicles 310a, 310b, 310n, a personal mobile device 330, a data evaluation and safety output server 350, and additional related components. As discussed below, the components of the system 300, individually or using communication and collaborative interaction, may receive data from one or more sources (e.g., one or more vehicles, one or more internal data computer systems, one or more external data computer systems, infrastructure devices, and the like) and may analyze the data to generate one or more machine learning datasets. The machine learning datasets may then be used to evaluate driving data to determine a ride performance characteristics, such as level of safety associated with the driving data (e.g., safe, unsafe, a score or ranking, or the like), level of smoothness associated with the driving data, level of satisfaction associated with the driving data, and the like. To perform such functions, the components shown in FIG. 3 each may be implemented in hardware, software, or a combination of the two. Additionally, each component of the system 300 may include a computing device (or system) having some or all of the structural components described above for computing device 101.

Vehicles 310a, 310b, 310n in the system 300 may be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) may be collected and/or analyzed. Each of vehicle 310a, 310b, 310n may include one or more components described herein with respect to "vehicle 310." Further, vehicles 310a, 310b, 310n may be non-autonomous, autonomous, or semi-autonomous vehicles and may be configured to transition between one or more of those modes of operation.

The vehicle 310 includes vehicle operation sensor 311 capable of detecting and recording various conditions at the vehicle and operational parameters of the vehicle. For example, sensor 311 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 311 also may detect and store data received from the vehicle's 310 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 311 may detect and store the external driving conditions, for example, external temperature, rain, snow, light levels, and sun position for driver visibility. For example, external cameras and proximity sensors 311 may detect other nearby vehicles, vehicle spacing, traffic levels, road conditions, traffic obstructions, animals, cyclists, pedestrians, and other conditions that may factor into a driving data/behavior analysis. Sensor 311 also may detect and store data relating to moving violations and the observance of traffic signals and signs by the vehicle 310. Additional sensors 311 may detect and store data relating to the maintenance of the vehicle 310, such as the engine status, oil level, engine coolant temperature, odometer reading, the level of fuel in the fuel tank, engine revolutions per minute (RPMs), software upgrades, and/or tire pressure.

Vehicles sensor 311 also may include cameras and/or proximity sensors capable of recording additional conditions inside or outside of the vehicle 310. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 311 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 310. Sensor 311 also may be configured to collect data relating to a driver's movements or the condition of a driver. For example, vehicle 310 may include sensors that monitor a driver's movements, such as the driver's eye position and/or head position, etc. Additional sensors 311 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 311 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 311 may determine when and how often the vehicle 310 stays in a single lane or strays into other lane. A Global Positioning System (GPS), locational sensors positioned inside the vehicle 310, and/or locational sensors or devices external to the vehicle 310 may be used to determine the route, speed, lane position, road-type (e.g. highway, entrance/exit ramp, residential area, etc.) and other vehicle position/location data.

The data collected by vehicle sensor 311 may be stored and/or analyzed within the vehicle 310, such as for example by a driving analysis computer 314 integrated into the vehicle, and/or may be transmitted to one or more external devices. For example, as shown in FIG. 3, sensor data may be transmitted via a telematics device 313 to one or more remote computing devices, such as personal mobile device 330, data evaluation and safety output server 350, and/or other remote devices.

As shown in FIG. 3, the data collected by vehicle sensor 311 may be transmitted to data evaluation and safety output server 350, personal mobile device 330, and/or additional external servers and devices via telematics device 313. Telematics device 313 may be one or more computing devices containing many or all of the hardware/software components as the computing device 101 depicted in FIG. 1. As discussed above, the telematics device 313 may receive vehicle operation data and driving data from vehicle sensor 311, and may transmit the data to one or more external computer systems (e.g., data evaluation and safety output server 350 of an insurance provider, financial institution, or other entity) over a wireless transmission network. Telematics device 313 also may be configured to detect or determine additional types of data relating to real-time driving and the condition of the vehicle 310. The telematics device 313 also may store the type of vehicle 310, for example, the make, model, trim (or sub-model), year, and/or engine specifications, as well as other information such as vehicle owner or driver information, insurance information, and financing information for the vehicle 310.

In the example shown in FIG. 3, telematics device 313 may receive vehicle driving data from vehicle sensor 311, and may transmit the data to a data evaluation and safety output server 350. However, in other examples, one or more of the vehicle sensors 311 or systems may be configured to receive and transmit data directly from or to a data evaluation and safety output server 350 without using a telematics device. For instance, telematics device 313 may be configured to receive and transmit data from certain vehicle sensors 311 or systems, while other sensors or systems may be configured to directly receive and/or transmit data to a data evaluation and safety output server 350 without using the telematics device 313. Thus, telematics device 313 may be optional in certain embodiments.

In some examples, telematics, sensor data, and/or other data (e.g., error or issue codes associated with maintenance of a vehicle) may be transmitted (e.g., to data evaluation and safety output server) and may be used to further aid in evaluating a safety level associated with particular driving data associated with the vehicle.

Vehicle 310 may further include a short-range communication system 316. The short-range communication system 316 may be vehicle-based data transmission systems configured to transmit vehicle operational data to other nearby vehicles, and to receive vehicle operational data from other nearby vehicles. In some examples, communication system 316 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system 316 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication system 316 and short-range communication systems of other vehicles or devices may be sent via DSRC, Bluetooth, satellite, GSM infrared, IEEE 802.11, WiMAX, RFID, and/or any suitable wireless communication media, standards, and protocols. In certain systems, short-range communication system 316 may include specialized hardware installed in vehicle 310 (e.g., transceivers, antennas, etc.), while in other examples the communication system 316 may be implemented using existing vehicle hardware components (e.g., radio and satellite equipment, navigation computers) or may be implemented by software running on the mobile device 330 of drivers and passengers within the vehicle 310.

The range of V2V communications between vehicle communication system 316 and other systems may depend on the wireless communication standards and protocols used, the transmission/reception hardware (e.g., transceivers, power sources, antennas), and other factors. Short-range V2V communications may range from just a few feet to many miles, and different types of driving behaviors, vehicle operational parameters, and the like, may be determined depending on the range of the V2V communications.

V2V communications also may include vehicle-to-infrastructure (V2I) communications, such as transmissions to or from vehicles to or from non-vehicle receiving devices, such as infrastructure. For example, infrastructure may include one or more of toll booths, rail road crossings, parking garages, road segments, parking lots, buildings or other structures, and/or road-side traffic monitoring devices which may include one or more sensors for detecting environmental conditions (e.g., weather, lighting, etc.) as well as parking availability. Certain V2V communication systems may periodically broadcast data from a vehicle 310, such as vehicle 310a, to any other vehicle, such as vehicle 310b, 310n, or other infrastructure device capable of receiving the communication, within the range of the vehicle's transmission capabilities. For example, a vehicle 310 may periodically broadcast (e.g., every 0.1 second, every 0.5 seconds, every second, every 5 seconds, etc.) certain vehicle operation data via its short-range communication system 316, regardless of whether or not any other vehicles or reception devices are in range. In other examples, a vehicle communication system 316 may first detect nearby vehicles and receiving devices, and may initialize communication with each by performing a handshaking transaction before beginning to transmit its vehicle operation data to the other vehicles and/or devices.

Broadcasts from infrastructure may also have varying ranges and, in some examples, infrastructure may broadcast to an intermediate station which may then relay the information to the data evaluation and safety output server 350 (or other device).

The types of vehicle operational data, vehicle driving data, or the like, transmitted to or from vehicle 310 and/or infrastructure may depend on the protocols and standards used for the V2V or V2I communication, the range of communications, and other factors. In certain examples, vehicle 310 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) may use internal clocks with synchronized time signals, and may send transmission times within V2V (or V2I) communications, so that the receiver may calculate its distance from the transmitting node based on the difference between the transmission time and the reception time. The state or usage of the vehicle's controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also may be transmitted in V2V (or V2I) communications.

In various other examples, any data collected by any vehicle sensors 311 potentially may be transmitted via V2V or V2I communication to other nearby vehicles or infrastructure devices receiving V2V or V2I communications from communication system 316. Further, additional vehicle driving data not from the vehicle's sensors (e.g., vehicle make/model/year information, driver insurance information, driving route information, vehicle maintenance information, driver scores, etc.) may be collected from other data sources, such as a driver's or passenger's mobile device 330, and transmitted using V2V or V2I communications to nearby vehicles and other receiving devices using communication system 316.

The system 300 in FIG. 3 also includes a mobile device 330. Mobile device 330 may be, for example, a smartphone or other mobile phone, personal digital assistant (PDAs), tablet computer, and the like, and may include some or all of the elements described above with respect to the computing device 101. As shown in this example, some mobile devices in systems 300 (e.g., mobile device 330) may be configured to establish communication sessions with vehicle-based devices and various internal components of vehicle 310 via wireless networks or wired connections (e.g., for docked devices), whereby such mobile devices 330 may have secure access to internal vehicle sensors 311 and other vehicle-based systems. However, in other examples, the mobile device 330 might not connect to vehicle-based computing devices and internal components, but may operate independently by communicating with vehicle 310 via their standard communication interfaces (e.g., telematics device 313, etc.), or might not connect at all to vehicle 310.

Mobile device 330 may include a network interface 332, which may include various network interface hardware (e.g., adapters, modems, wireless transceivers, etc.) and software components to enable mobile device 330 to communicate with data evaluation and safety output server 350, vehicle 310, and various other external computing devices. One or more specialized software applications, such as a data analysis application 334 may be stored in the memory of the mobile device 330. The data analysis application 334 may be received (e.g., downloaded or otherwise provided) via network interface 332 from the data evaluation and safety output server 350, vehicle 310, or other application providers (e.g., application stores). As discussed below, the data analysis application 334 may or may not include various user interface screens, and may be configured to run as user-initiated applications or as background applications. The memory of the mobile device 330 also may include databases configured to receive and store vehicle data, driving data, driving trip data, and the like, associated with one or more drivers, vehicles, and/or road segments.

Mobile device 330 may include various components configured to generate and/or receive vehicle data, driver data, and driving data or other operational data, as well as communicate with other devices within the system 300. For instance, mobile device 330 may include one or more sensors 335 configured to collect information similar to sensors 311 in vehicle 310. As discussed herein, the data analysis software application 334 may store and analyze the data from various mobile device components, historical data, and the like, and may use this data, in conjunction with one or more other devices (e.g., data evaluation and safety output server 350), to evaluate a safety level of driving data.

Mobile computing device 330 may store, analyze, and/or transmit the data to one or more other devices. For example, mobile computing device 330 may transmit data directly to one or more data evaluation and safety output servers 350. As discussed above, the data evaluation and safety output server 350 may analyze driving data against one or more machine learning datasets to determine a safety level associated with the driving data. In some examples, one or more of these functions may be performed by the processing components of the mobile device (e.g., via data analysis application 334). Therefore, in certain arrangements, mobile computing device 330 may be used in conjunction with, or in place of, the data evaluation and safety output server 350.

Vehicle 310 may include driving analysis computer 314, which may be separate computing devices or may be integrated into one or more other components within the vehicle 310, such as the telematics device 313, autonomous driving systems, or the internal computing systems of vehicle 310. As discussed above, driving analysis computers 314 also may be implemented by computing devices independent from the vehicle 310, such as mobile computing device 330 of the drivers or passengers, or one or more separate computer systems (e.g., a user's home or office computer). In any of these examples, the driving analysis computer 314 may contain some or all of the hardware/software components as the computing device 101 depicted in FIG. 1. Further, in certain implementations, the functionality of the driving analysis computers, such as storing and analyzing driver data, vehicle data, driving data and driving behaviors, evaluating data for safety, and the like, may be performed in a central data evaluation and safety output server 350 rather than by the individual vehicle 310 or personal mobile device 330. In such implementations, the vehicle 310 and and/or mobile device 330, might only collect and transmit driver data, sensor data, and the like to data evaluation and safety output server 350, and thus the vehicle-based driving/analysis computer 314 may be optional.

The system 300 also may include one or more data evaluation and safety output servers 350, containing some or all of the hardware/software components as the computing device 101 depicted in FIG. 1. The data evaluation and safety output server 350 may include hardware, software, and network components to receive driving data, evaluate driving data to determine a safety output or level, generate and/or transmit instructions for vehicle operation, and the like, from one or more vehicles 310, mobile devices 330, and other data sources. The data evaluation and safety output server 350 may include a data evaluation and safety output database 352 and data evaluation and safety output system 351 to respectively store and analyze driver data, vehicle data, sensor data, and etc., received from vehicle 310, mobile device 330, and/or other data sources. In some examples, the data evaluation and safety output system 351 may include many or all of the components of the vehicle data analysis and safety determination computing platform 210 described with respect to FIG. 2.

The data evaluation and safety output server 350 may initiate communication with and/or retrieve at driving data from mobile device 330, or by way of separate computing systems over one or more computer networks (e.g., the Internet). In some examples, some data may be received from vehicle 310 wirelessly via telematics device 313. Additionally, the data evaluation and safety output server 350 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., coverage amount, deductible amount, premium amount, insured status) for the vehicle, driver, and/or other nearby vehicles and drivers, and the like. The data evaluation and safety output server 350 may also receive data from one or more internal sources, such as insurance information, claim information, and the like.

Data stored in the data evaluation and safety output database 352 may be organized in any of several different manners. For example, a safety output table may contain data related to previous accidents or incidents, a severity level of the accident or incident, type of damage, cost of damage, whether an injury occurred, a severity of an injury, and the like. Other tables in the database 352 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The data evaluation and safety output system 351 within the data evaluation and safety output server 350 may be configured to retrieve data from the database 352, or may receive data (e.g., driving data from one or more vehicles) directly from mobile device 330, vehicles 310a, 310b, 310n, or other data sources, and may perform one or more analyses to evaluate the data, generate one or more machine learning datasets, evaluate additional driving or vehicle data against the one or more machine learning datasets to determine a safety level or output for the data, generate notifications, generate and/or transmit one or more instructions to one or more autonomous vehicles, and other related functions. Such functions and further descriptions and examples of the algorithms, functions, and analyses that may be executed by the systems, devices, and arrangements described herein are explained more fully herein.

In various examples, the data evaluation and safety output analyses, identifications and determinations may be performed entirely in the data evaluation and safety output server 350, may be performed entirely in the vehicle-based driving analysis computing module 314, or may be performed entirely in the data analysis application 334 of mobile device 330. In other examples, certain analyses of driving data, vehicle data, and the like, may be performed by vehicle-based devices (e.g., within driving analysis device 314) or mobile device 330 (e.g., within application 334), while other data analyses are performed by the data evaluation and safety output system 351 at the data evaluation and safety output server 350. Various other combinations of devices processing data may be used without departing from the invention.

Figure 4A:
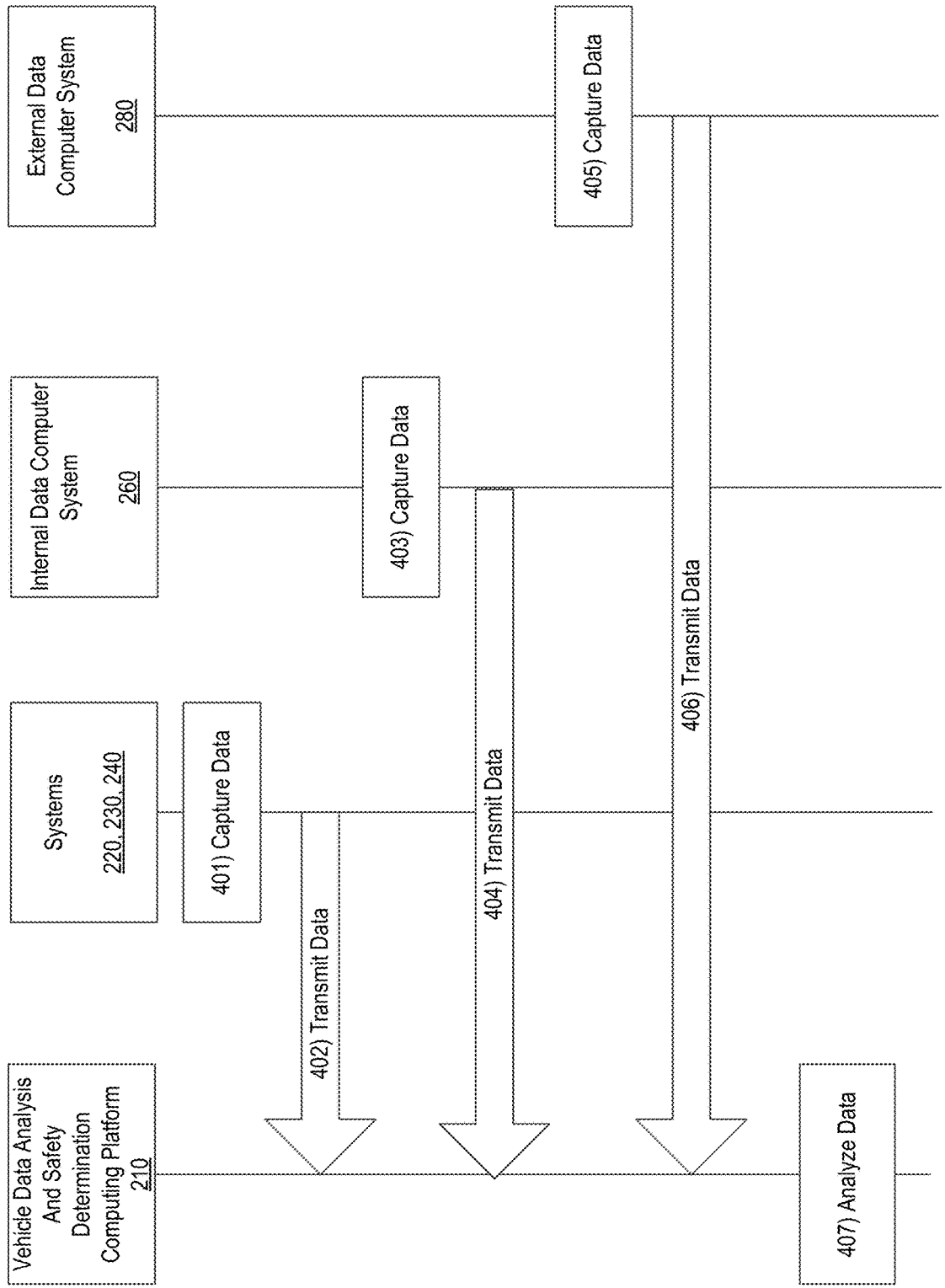
FIGS. 4A and 4B illustrate one example event sequence for providing vehicle data analysis and safety output functions in accordance with one or more aspects described herein.
Figure 4B:
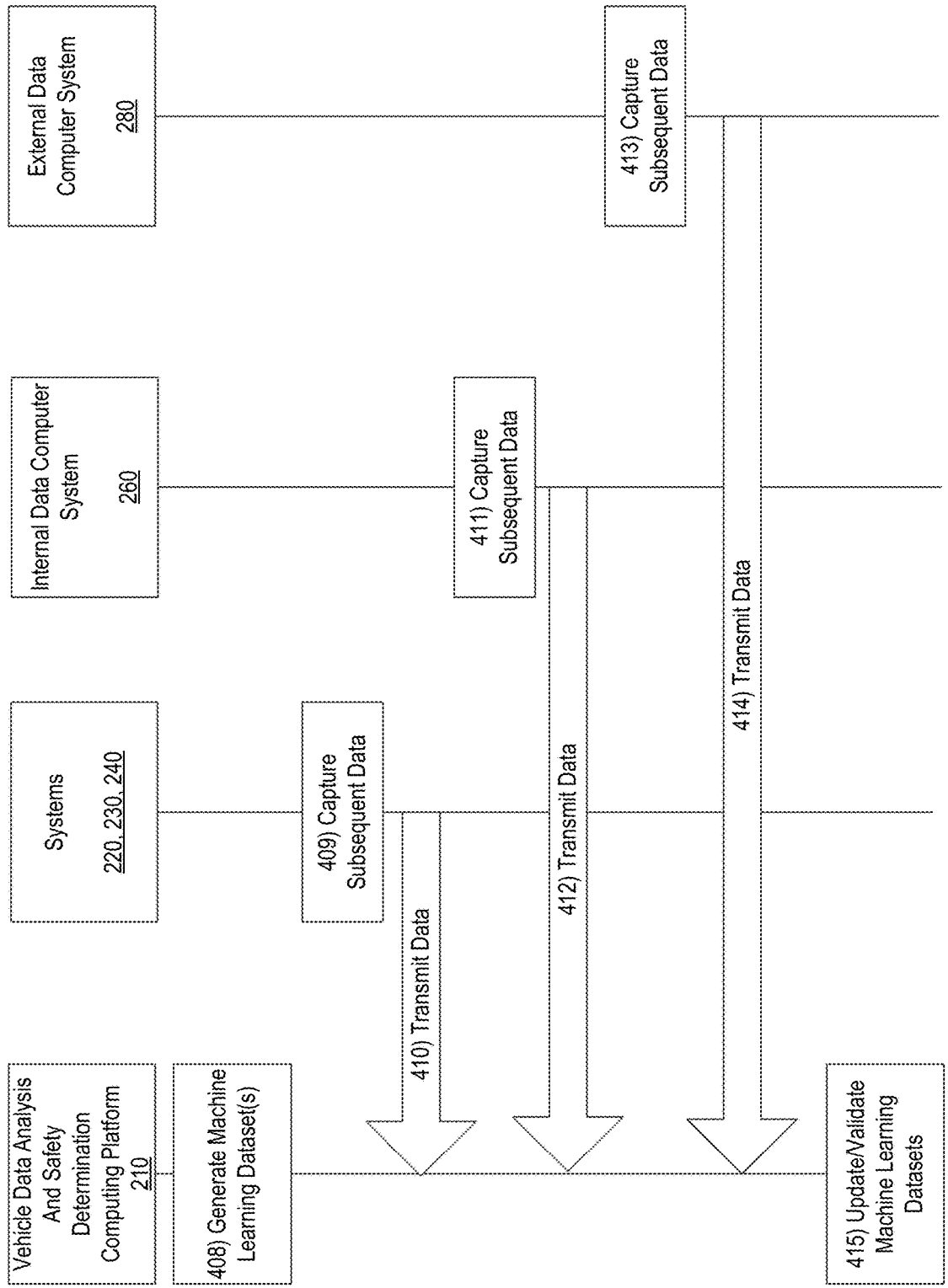

FIGS. 4A-4B illustrate one example event sequence for receiving and analyzing data from a plurality of sources to generate one or more machine learning datasets, according to one or more aspects described herein. The sequence illustrated in FIGS. 4A-4B is merely one example sequence and various other events may be included, or events shown may be omitted, without departing from the invention.

With reference to FIG. 4A, in step 401, data may be collected by one or more systems, such as systems 220, 230, 240. The systems may include systems arrangement in one or more vehicles (e.g., autonomous, non-autonomous, semi-autonomous), and may receive data from one or more sensors in the vehicle, in a mobile device located within a vehicle, or the like. The data may include data related to driving behaviors, vehicle performance, and the like, as discussed more fully above. In some examples, data may include signals received from one or more sensors indicating hard braking occurrences, swerving, lane departures, and the like. In step 402, the data may be transmitted from the one or more systems (e.g., in one or more vehicles) to the vehicle data analysis and safety determination computing platform 210.

In step 403, data from one or more internal data computer systems 260 may be retrieved and/or collected. For instance, data related to one or more insurance policies, insurance claims, damage associated with insurance claims, costs of damage, and the like, may be retrieved from one or more databases and, in step 404, the data may be transmitted to the vehicle data analysis and safety determination computing platform 210.

In step 405, data from one or more external data computer systems 280 may be retrieved and/or collected. For instance, data related to weather conditions (e.g., historical, current, etc.), traffic conditions (e.g., historical, current, etc.), road types, speed limits, roadway conditions (historical, current, etc.) and the like, may be retrieved from one or more databases and, in step 406, the data may be transmitted to the vehicle data analysis and safety determination computing platform 210.

In step 407, the data may be received by the vehicle data analysis and safety determination computing platform 210 and may be analyzed. In some examples, the data may be received and sorted based on driving trips. In other examples, the data may be segregated into segments or portions of driving trips (e.g., portions of a trip from a first location to a second location including driving data associated with points between). Accordingly, the driving data may be analyzed at a trip level, and/or at a more granular level (e.g., each segment may be analyzed, a level of safety or other output may be generated for each segment, or the like) to better understand driving behaviors and whether they are safe of unsafe in smaller data windows (e.g., rather than evaluating larger time periods of data which can mask unsafe behaviors).

Analyzing the data may include mapping or linking data related to one or more insurance claims to particular driving data from one or more vehicles, and/or data related to external or environmental conditions. In some examples, the data may be mapped or linked based on time and location data embedded within the received data. This time and location data may be used to identify driving data from a particular time and/or location of an incident for which a claim was generated, as well as environmental conditions at the time.

With reference to FIG. 4B, the analyzed data may be used to generate one or more machine learning models and/or one or more machine learning datasets in step 408. In some examples, the machine learning datasets may link events based on the analyzed data. For instance, the machine learning datasets may link sequences, patterns, etc. between driving data, including driving behaviors, vehicle operational data, and the like, and accidents or incidents to determine whether the driving data should be considered safe and/or to predict a likelihood of an incident (e.g., to predict how safe a particular driving behavior, or driving data, may be).

In step 409, subsequent data may be captured from one or more systems, such as systems 220, 230, 240. The subsequent data may include driving data, vehicle operational data, and the like, from one or more driving trips that occurred after previous data was collected and/or transmitted to the computing platform 210. In step 410, the data may be transmitted to the vehicle data analysis and safety determination computing platform 210.

In step 411, subsequent data may be collected from internal data computer system 260. The subsequent data may include any additional information (e.g., new claims, etc.), modified information (e.g., updated costs of accident or damage), and the like. In step 412, the data may be transmitted to the vehicle data analysis and safety determination computing platform 210.

In step 413, subsequent data may be captured from external data computer system 280. The external data may include additional or updated data related to environmental conditions. In step 414, the data may be transmitted to the vehicle data analysis and safety determination computing platform 210.

In some examples, additional or subsequent data may be received from one or more of systems 220, 230, 240, internal data computer system 260, external data computer system 280, and the like. However, in some arrangements, subsequent data may be received from less than all of these sources (e.g., from one or more systems 220, 230, 240, from one or more systems 220, 230, 240 and internal data computer system 260, etc.). Various combinations of data sources may be used without departing from the invention.

In step 415, one or more machine learning datasets may be updated and/or validated based on the subsequent data received. For instance, subsequent data may be used to validate data in one or more machine learning datasets or to update data contained therein.

Figure 5:
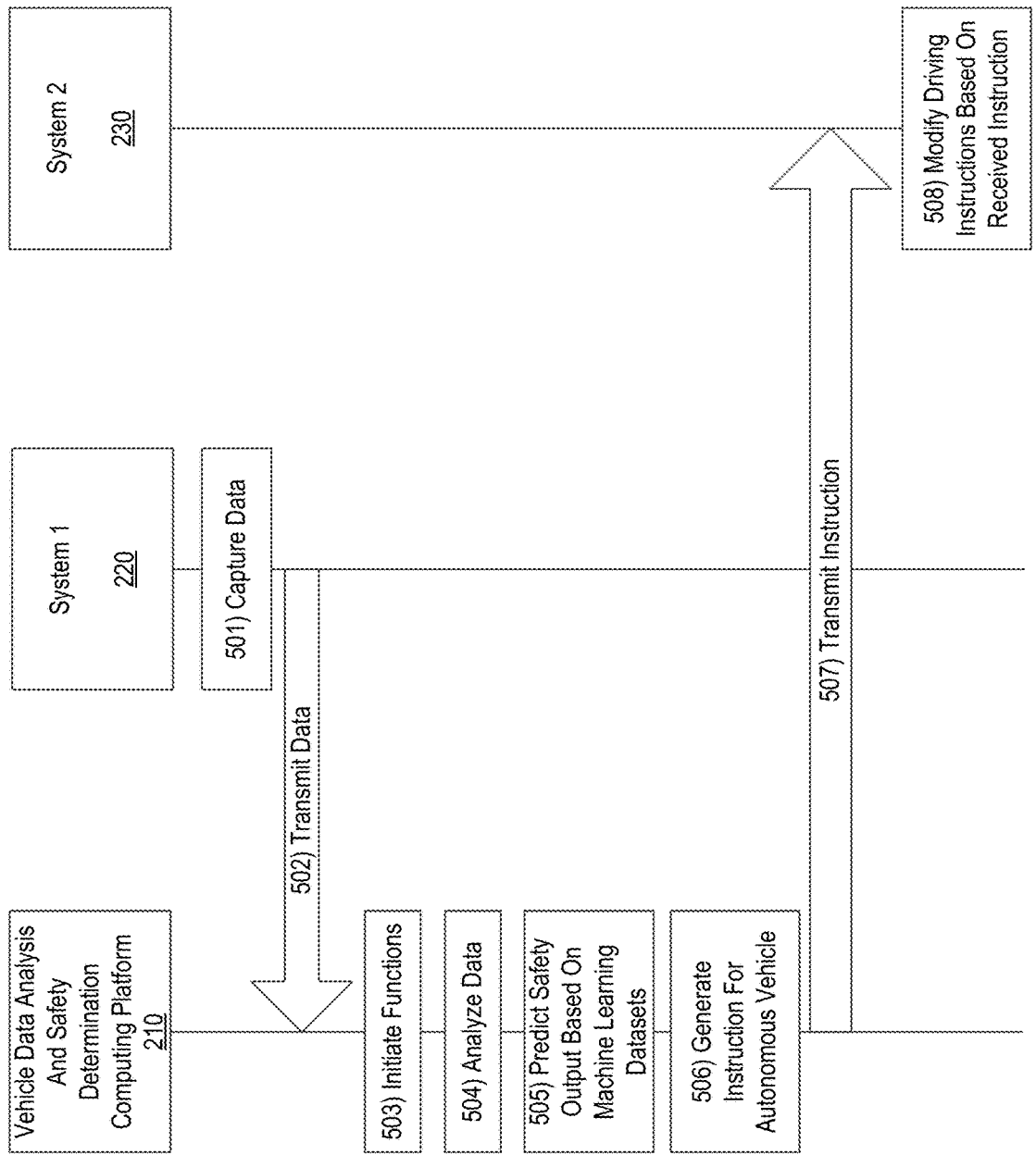
FIG. 5 illustrates one example event sequence for providing vehicle data analysis, safety output, and vehicle control functions in accordance with one or more aspects described herein.

FIG. 5 illustrates one example event sequence for receiving and analyzing driving data to determine a safety level or output, according to one or more aspects described herein. The sequence illustrated in FIG. 5 is merely one example sequence and various other events may be included, or events shown may be omitted, without departing from the invention.

In step 501, data may be captured from a vehicle system, such as system 1 220. System 220 is merely used as one example system. Various other systems (e.g., system 2 230, system n 240) may be used without departing from the invention. The data captured may include sensor data related to vehicle operational parameters, driving behaviors, environmental conditions, and the like. The data may be collected over a predetermined time period (e.g., one day, one week, one month, etc.) or may be collected in smaller segments (e.g., by trip, portions or segments of trip, by certain number of minutes or seconds, etc.). In step 502, the data may be transmitted to the vehicle data analysis and safety determination computing platform 210.

In step 503, functions associated with data analysis and safety determinations may be initiated. For example, in response to receiving data in step 502, one or more functions of the computing platform 210 may be enabled and initiated or activated, in order to perform the requested functions.

In step 504, the data may be analyzed. For instance, the data may be compared to one or more machine learning datasets. In step 505, a safety output (e.g., in at least some examples, a ride performance characteristic) may be determined based on the analysis of the data (e.g., the comparison of the data to one or more machine learning datasets). In some examples, the safety output may be a determination of whether the data evaluated is either deemed "safe" or "unsafe." This determination may be based on various criteria within the machine learning dataset. In another example, the safety output may include a score, ranking or level of safety associated with the driving data. For instance, by comparing various driving characteristic (e.g., hard braking occurrences, swerving, lane departures, etc.) to the machine learning datasets, the computing platform 210 may predict how safe (e.g., a likelihood of an accident or incident occurring) the driving associated with the driving data is (e.g., a level or safety score). In some examples, the analysis may include evaluating a number of times different behaviors occurred in a predetermined time period or data window (e.g., number of minutes spent driving at night in a week, number of hard braking events in a driving trip segment, or the like).

In step 506, based on the safety output determination, one or more instructions for one or more autonomous vehicles may be generated. For instance, if the evaluated driving data is deemed safe, an instruction may be generated to implement the behaviors or other aspects identified in the driving data. In another example, if the driving data is determined to be unsafe, an instruction may be generated to avoid implementing the behaviors or other aspects detected in the driving data.

In step 507, the instruction may be transmitted to one or more other vehicles, such as system 230 in a vehicle. In some examples, the vehicle associated with system 2 230 (for purposes of this example) may be an autonomous vehicle and the generated instruction may be transmitted thereto. In step 508, driving instructions associated with the autonomous vehicle may be modified based on the instructions received by the system. Accordingly, the driving behaviors implemented by the autonomous vehicle may be modified based on driving data evaluated from one or more autonomous, non-autonomous, or semi-autonomous vehicles.

Figure 6:
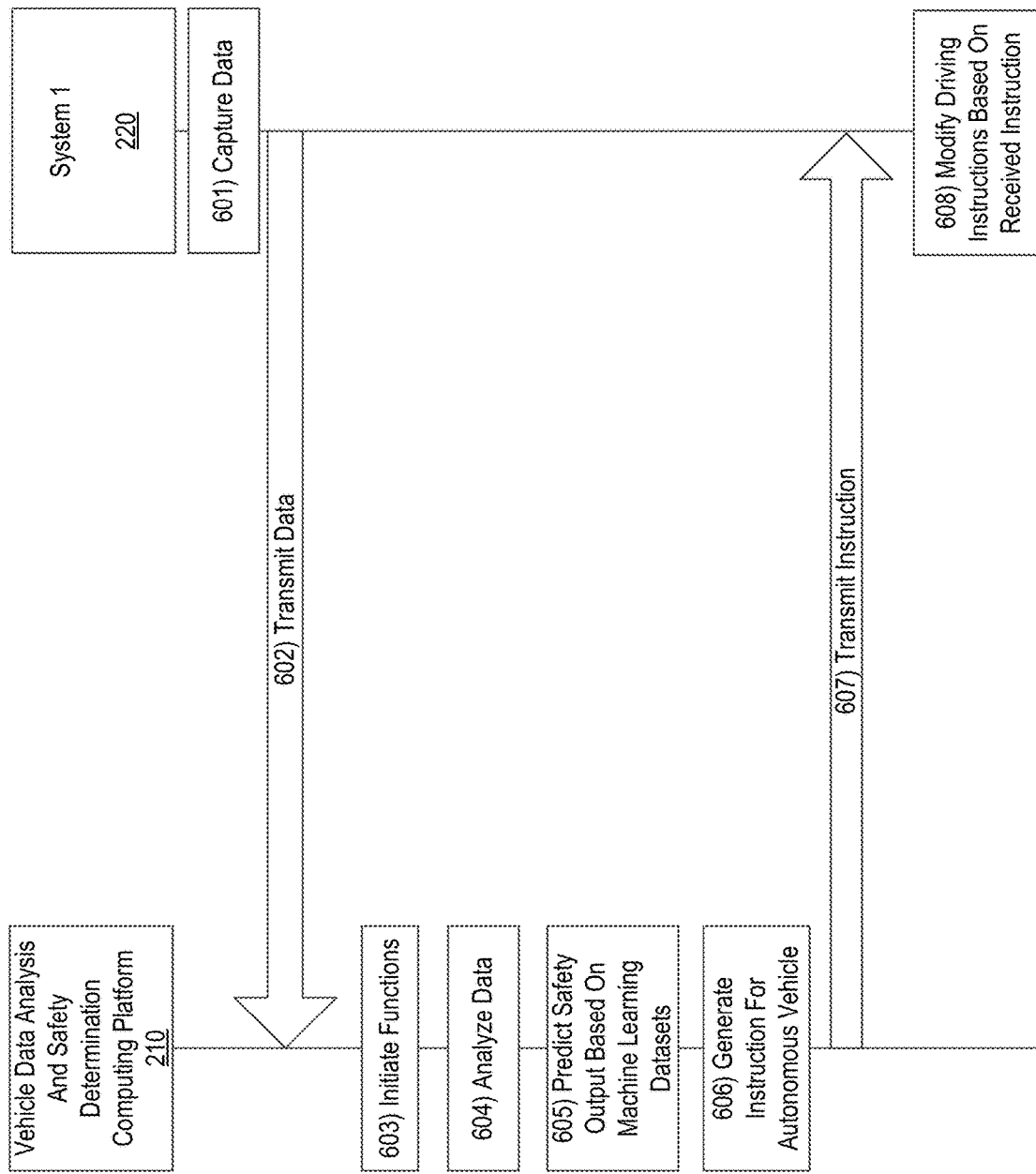
FIG. 6 illustrates another example event sequence for providing vehicle data analysis, safety output, and vehicle control functions in accordance with one or more aspects described herein.

FIG. 6 illustrates another example event sequence for receiving and analyzing driving data to determine a safety level or output, according to one or more aspects described herein. The sequence illustrated in FIG. 6 is merely one example sequence and various other events may be included, or events shown may be omitted, without departing from the invention.

In step 601, data may be captured from a vehicle system, such as system 1 220. System 220 is merely used as one example system. Various other systems (e.g., system 2 230, system n 240) may be used without departing from the invention. The data captured may include sensor data related to vehicle operational parameters, driving behaviors, environmental conditions, and the like. The data may be collected over a predetermined time period (e.g., one day, one week, one month, etc.) or may be collected in smaller segments (e.g., by trip, portions or segments of trip, by certain number of minutes or seconds, etc.). In some examples, the vehicle associated with system 1 220 may be operable in autonomous, non-autonomous and/or semi-autonomous modes. Accordingly, data may be collected from the system 220 (and associated vehicle) in any mode of operation. In step 602, the data may be transmitted to the vehicle data analysis and safety determination computing platform 210.

In step 603, functions associated with data analysis and safety determinations may be initiated. For example, in response to receiving data in step 602, one or more functions of the computing platform 210 may be enabled and initiated or activated, in order to perform the requested functions.

In step 604, the data may be analyzed. For instance, the data may be compared to one or more machine learning datasets. In step 605, a safety output (e.g., in at least some examples, a ride performance characteristic) may be determined based on the analysis of the data (e.g., the comparison of the data to one or more machine learning datasets). In some examples, the safety output may be a determination of whether the data evaluated is either deemed "safe" or "unsafe." This determination may be based on various criteria within the machine learning dataset. In another example, the safety output may include a score, ranking or level of safety associated with the driving data. For instance, by comparing various driving characteristic (e.g., hard braking occurrences, swerving, lane departures, etc.) to the machine learning datasets, the computing platform 210 may predict how safe (e.g., a likelihood of an accident or incident occurring) the driving associated with the driving data is (e.g., a level or safety score). In some examples, the analysis may include evaluating a number of times different behaviors occurred in a predetermined time period or data window (e.g., number of minutes spent driving at night in a week, number of hard braking events in a driving trip segment, or the like).

In step 606, based on the safety output determination, one or more instructions for one or more autonomous vehicles may be generated. For instance, if the evaluated driving data is deemed safe, an instruction may be generated to implement the behaviors or other aspects identified in the driving data. In another example, if the driving data is determined to be unsafe, an instruction may be generated to avoid implementing the behaviors or other aspects detected in the driving data.

In step 607, the instruction may be transmitted to the vehicle from which it was received, such as system 1 220 in a vehicle. In step 608, driving instructions associated with operating the vehicle in an autonomous vehicle may be modified based on the instructions received by the system. Accordingly, the driving behaviors implemented by the autonomous vehicle may be modified based on driving data evaluated from one or more autonomous, non-autonomous, or semi-autonomous vehicles.

Figure 7:
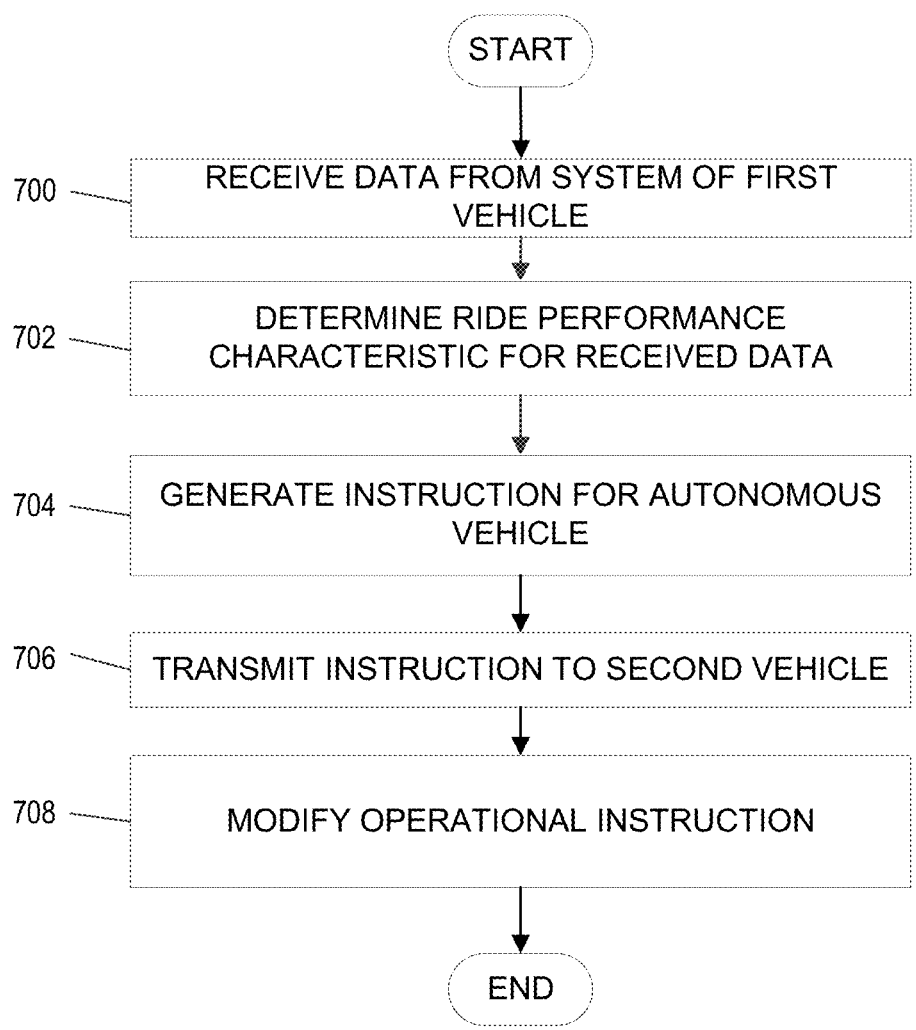
FIG. 7 illustrates one example method for providing vehicle data analysis, safety output and vehicle control functions in accordance with one or more aspects described herein.

FIG. 7 illustrates one example method of analyzing vehicle and/or driving data and generating one or more safety determinations in accordance with one or more aspects described herein. One or more of the steps described with respect to FIG. 7 may be performed by the vehicle data analysis and safety determination computing platform 210, other devices, systems, and the like, described herein, and/or may be performed in real-time or near real-time.

In step 700, data may be received from a system of a first vehicle. In some examples, the data may including driving behaviors, vehicle operational data, and the like. The first vehicle may be configured to operate in an autonomous, non-autonomous or semi-autonomous mode and the data collected from the vehicle may be from operation in one or more of these modes of operation. The data may include data from one or more trips, from segments of trips, and the like. In some examples, trip data may be received and may be partitioned into segments based on segments within a trip, data corresponding to certain predetermined windows of time or time periods, or the like, to enable analysis of the data at a more granular level, thereby improving the accuracy of predictions made.

In step 702, the data may be compared to one or more machine learning datasets to predict or determine a ride performance characteristic, such as a level of safety, level of smoothness, level of satisfaction, or the like, associated with the driving data. For instance, one or more aspects of the data (e.g., occurrences of hard braking, occurrences of swerving, driving at night, etc.) may be compared to one or more machine learning datasets to predict a safety output, such as a level of safety, safety score, or the like. In some examples, a number of occurrences of each aspect may be considered in determining or predicting the safety output. Additionally or alternatively, a number of occurrences within predetermined time period may be considered when determining or predicting the safety output. These values may be compared to one or more thresholds to, in some examples, generate the safety output.

Based on the predicted safety output, in step 704, one or more instructions for an autonomous vehicle may be generated. For instance, an autonomous vehicle may include one or more systems (such as system 220, 230, 240) that may include instructions for operations of the autonomous vehicle (or vehicle when operating in an autonomous mode). These operational instructions may control operation of the autonomous vehicle (or vehicle operating in an autonomous mode). Accordingly, based on a safety output associated with the driving data, one or more instructions may be generated to improve operation of the autonomous vehicle (e.g., by improving safety, reducing risk, reducing or eliminating driving behaviors identified as unsafe, or the like). In some examples, the instructions may include not only a modification to the operational instructions of the vehicle, but also an instruction or command to implement the instruction.

In step 706, the generated instruction may be transmitted to a second vehicle. In some examples, the second vehicle may be the same as the first vehicle (e.g., data may be collected from the vehicle and then instructions to modify operational instructions may be transmitted back to the same vehicle). In some examples, a vehicle may collect data when in a non-autonomous mode and the instruction transmitted back to the vehicle may modify operational instructions for the vehicle when operating in an autonomous mode. In other examples, the second vehicle may be different from the first vehicle. For instance, data may be collected from a first vehicle and the generated instruction may be transmitted to one or more other vehicles different from the first vehicle.

In step 708, operational instructions associated with operating the vehicle (e.g., the second vehicle) may be modified based on the transmitted instruction. For instance, the generated instruction may include modified operational instructions for operating the autonomous vehicle (e.g., may modify the way the vehicle operates, decisions made, etc.), as well as an instruction or command to implement the modified instruction(s). Accordingly, the instructions used to operate the autonomous vehicle (or vehicle operating in an autonomous mode) may be made safer by implementing instructions predicted to have a minimum level of safety based on driving data from vehicles.

Figure 8:
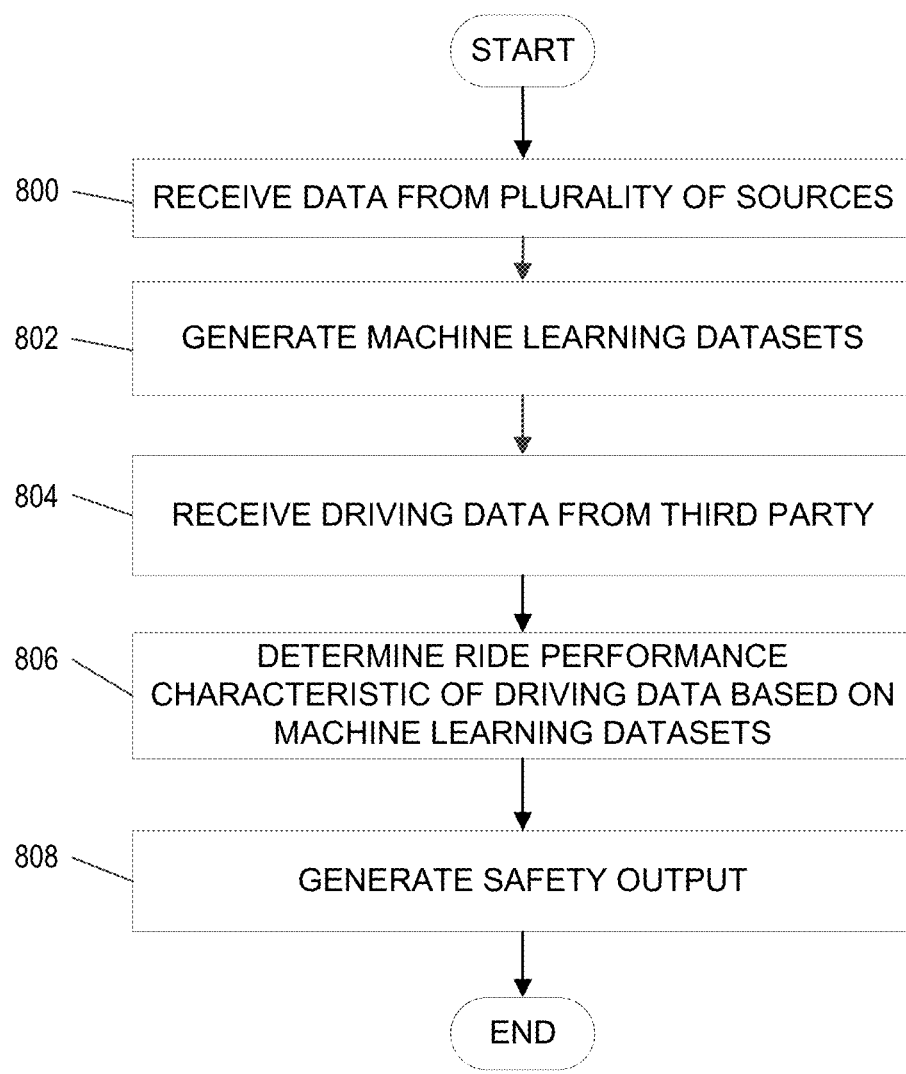
FIG. 8 illustrates one example method for providing vehicle data analysis and safety output functions in accordance with one or more aspects described herein.

FIG. 8 illustrates one example method of determining a safety output associated with driving data received from one or more third parties in accordance with one or more aspects described herein. For instance, entities who develop autonomous vehicle training data, and the like, may submit driving datasets to be evaluated to predict or determine a ride performance characteristic, such as a level of safety (e.g., a safety score), level of smoothness, level of satisfaction, or the like, associated with the driving data. This may aid in implementing safe autonomous driving instructions and avoiding unsafe or high risk autonomous driving instructions.

In step 800, data may be received from a plurality of sources. For instance, as discussed herein, data may be received from systems including or in communication with one or more telematics device, mobile device, on-board vehicle systems or devices, infrastructure device, databases storing public information, and the like. The data may include driving data, environmental data, road condition data, type of roadway information, insurance information, claim information, and the like. In step 802, one or more machine learning datasets may be generated from the received data.

In step 804, one or more driving datasets may be received from, for example, a third party. For instance, the driving datasets might not be received directly from one or more vehicles, vehicle systems, or other devices associated with the vehicle or user associated with the vehicle. Rather, the data may be collected or otherwise generated by a third party and the third party (and/or one or more associated systems) may transmit the data to, for example, the vehicle data analysis and safety determination computing platform 210, for analysis.

In step 806, a predicted or determined ride performance characteristic, such as level of safety (e.g., risk associated with the data), level of smoothness, level of satisfaction, or the like, for the one or more driving datasets may be determined. As discussed herein, the predicted or determined ride performance characteristic may be based on the generated one or more machine learning datasets. In step 808, a safety output may be generated for each driving dataset. For instance, a score, ranking, or other output may be generated for each dataset and the output may be transmitted to the third party or other entity from which the datasets were received. The third party may then use the safety output as desired.

The arrangements described herein provide systems, apparatuses, methods, and the like, using machine learning datasets to evaluating driving data, vehicle operational data, and the like to determine a level of safety associated therewith. One or more instructions, to a driving, autonomous vehicle, or the like, may be generated based on the evaluation. The instructions may be generated and/or transmitted in real-time, in order to quickly and efficiently update vehicle operation or notify drivers of a ride performance characteristic, such as level of safety, level of smoothness, level of satisfaction, or the like.

Further, as discussed above, aspects described herein may be used to provide objective rating of driving datasets to, for example, a third party. As discussed above, datasets may be provided to an entity, evaluated by the entity using the processes described herein, and an output may be transmitted back to the third party requesting evaluation.

In still other arrangements, aspects described herein may be used to generate, update, validate or the like one or more autonomous vehicle simulators. For instance, driving data may be evaluated and datasets determined to be safe may be used in one or more autonomous vehicle simulators and/or may be used to train autonomous vehicles in simulation. The simulation may then be used, by the simulation entity or another entity, to build or generate autonomous vehicles.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A computing platform comprising:
   at least one processor;
   a communication interface in communication with the at least one processor; and
   memory storing computer-readable instructions that, when executed by the at least one processor, cause the computing platform to:
   receive, from a mobile device of a driver in a first vehicle, driving data associated with the first vehicle, the driving data including trip data gathered by one or more sensors associated with the mobile device during a trip associated with the trip data and the first vehicle;
   receive external data from one or more data sources, the external data including policy data associated with the first vehicle;
   segment the trip data gathered by the mobile device into a plurality of segments based on the first vehicle stopping for a threshold time period;
   identify a driving behavior within the driving data separately for each of the plurality of segments;
   determine, based on a plurality of machine learning datasets, a ride performance characteristic associated with each of the plurality of segments of the driving data, the ride performance characteristic including at least a quantified level of smoothness associated with each of the plurality of segments of the driving data, wherein the plurality of machine learning datasets is generated using the external data;
   generate, based on the ride performance characteristic, an output of safe or unsafe associated with each of the plurality of segments of the driving data,
   wherein for each of the plurality of segments, when the output of safe is generated, generate, based on the associated ride performance characteristic, a first instruction for a second vehicle, wherein the first instruction includes a modification to an operational instruction of the second vehicle, and
   wherein for each of the plurality of segments, when the output of unsafe is generated,
      generate, based on the associated ride performance characteristic, a second instruction, different from the first instruction, for the second vehicle, wherein the second instruction includes a modification to an operational instruction of the second vehicle, and
      transmit a notification to the mobile device of the driver;
   transmit at least one of the first instruction or the second instruction to the second vehicle, wherein the second vehicle is an autonomous or semi-autonomous vehicle;
   cause at least one operational instruction associated with the second vehicle to be modified based on the at least one of the first instruction or the second instruction; and
   update the plurality of machine learning datasets using the at least one of the first instruction or the second instruction.

2. The computing platform of claim 1, wherein the determining the ride performance characteristic associated with the driving data is performed in real-time.

3. The computing platform of claim 1, wherein determining the ride performance characteristic associated with the driving data includes predicting a level of safety associated with each segment of the plurality of segments of the driving trip.

4. The computing platform of claim 1, further including instructions that, when executed by the at least one processor, cause the computing platform to generate the plurality of machine learning datasets based on a plurality of types of data received from a plurality of sources.

5. The computing platform of claim 4, wherein the plurality of sources includes at least one of: vehicle systems, mobile devices, internal data computer systems or external data computer systems.

6. The computing platform of claim 4, wherein the plurality of types of data includes at least one of: driving data, vehicle operational data, claim data, policy data, or environmental conditions data.

7. The computing platform of claim 1, wherein the second vehicle is different from the first vehicle.

8. A method comprising:
   at a computing platform comprising at least one processor, memory, and a communication interface:
   receiving, by the at least one processor via the communication interface and from a mobile device of a driver in a first vehicle, driving data associated with the first vehicle, wherein the driving data is for a trip and is gathered by one or more sensors associated with the mobile device during the trip associated with the first vehicle;

receiving external data from one or more data sources, the external data including policy data associated with the first vehicle;

segmenting the driving data for the trip gathered by the mobile device into a plurality of segments based on the first vehicle stopping for a threshold time period;

identifying a driving behavior within the driving data separately for each of the plurality of segments;

determining, by the at least one processor and based on a plurality of machine learning datasets, a ride performance characteristic associated with each of the plurality of segments of the driving data, the ride performance characteristic including at least a quantified level of smoothness associated with each of the plurality of segments of the driving data, wherein the plurality of machine learning datasets is generated using the external data;

generating, based on the ride performance characteristic, an output of safe or unsafe associated with each of the plurality of segments of the driving data, wherein for each of the plurality of segments, when the output of safe is generated, generating, by the at least one processor and based on the associated ride performance characteristic, a first instruction for an autonomous vehicle, wherein the first instruction includes a modification to an operational instruction of the autonomous vehicle, and wherein for each of the plurality of segments, when the output of unsafe is generated,
generating, based on the associated ride performance characteristic, a second instruction, different from the first instruction, for the autonomous vehicle, wherein the second instruction includes a modification to an operational instruction of the autonomous vehicle, and
transmit a notification to the mobile device of the driver;

transmitting, by the at least one processor and via the communication interface, at least one of the first instruction or the second instruction to modify at least one operational instruction of the autonomous vehicle to a second vehicle, the second vehicle being the autonomous vehicle; and updating the plurality of machine learning datasets using at least one of the first instruction or the second instruction.

9. The method of claim 8, wherein the determining the ride performance characteristic associated with the driving data is performed in real-time.

10. The method of claim 8, wherein the at least one of the first instruction or the second instruction are generated in real-time.

11. The method of claim 8, wherein determining the ride performance characteristic associated with the driving data includes predicting a level of safety associated with each segment of the plurality of segments of the driving trip.

12. The method of claim 8, further comprising:
generating the plurality of machine learning datasets based on a plurality of types of data received from a plurality of sources.

13. The method of claim 12, wherein the plurality of sources includes one or more of: vehicle systems, mobile devices, internal data computer systems or external data computer systems.

14. The method of claim 12, wherein the plurality of types of data includes at least one of: driving data, vehicle operational data, claim data, policy data, or environmental conditions data.

15. One or more non-transitory computer-readable media storing instructions that, when executed by a computing platform comprising at least one processor, memory, and a communication interface, cause the computing platform to:
receive, from a mobile device of a driver in a first vehicle, driving data gathered by one or more sensors associated with the mobile device during a trip associated with the first vehicle;
receive external data from one or more data sources, the external data including policy data associated with the first vehicle;
segment the driving data gathered by the mobile device into a plurality of segments based on the first vehicle stopping during the trip;
identify a driving behavior within the driving data for each of the plurality of segments;
determine, based on a plurality of machine learning datasets, a ride performance characteristic associated with each of the plurality of segments of the driving data, the ride performance characteristic including at least a quantified level of smoothness associated with the driving data, wherein the plurality of machine learning datasets is generated using the external data;
generate, based on the ride performance characteristic, an output of safe or unsafe associated with each of the plurality of segments of the driving data,
wherein for each of the plurality of segments, when the output of safe is generated, generate, based on the associated ride performance characteristic, a first instruction for an autonomous vehicle, wherein the first instruction includes a modification to an operational instruction of the autonomous vehicle, and
wherein for each of the plurality of segments, when the output of unsafe is generated,
generate, based on the associated ride performance characteristic, a second instruction, different from the first instruction, for the autonomous vehicle, wherein the second instruction includes a modification to an operational instruction of the autonomous vehicle, and
transmit a notification to the mobile device of the driver;
transmit at least one of the first instruction or the second instruction to a second vehicle, the second vehicle being the autonomous vehicle; and
update the plurality of machine learning datasets using at least one of the first instruction or the second instruction.

16. The one or more non-transitory computer-readable media of claim 15, wherein the determining the ride performance characteristic associated with the driving data is performed in real-time.

17. The one or more non-transitory computer-readable media of claim 15, wherein the at least one of the first instruction or the second instruction are generated in real-time.

18. The computing platform of claim 1, wherein the at least one of the first instruction or the second instruction is transmitted via a short-range wireless protocol.

19. The computing platform of claim 1, wherein the at least one operational instruction associated with the second vehicle is modified in real-time.

* * * * *